US012800067B2

(12) United States Patent
MacDonald

(10) Patent No.: US 12,800,067 B2
(45) Date of Patent: Nov. 17, 2026

(54) REINFORCED PIPE AND METHOD OF INSTALLATION

(71) Applicant: Construction Product Marketing, LLC, Phoenix, AZ (US)

(72) Inventor: Christopher P. MacDonald, Phoenix, AZ (US)

(73) Assignee: Construction Product Marketing, LLC, Phoenix, AZ (US)

( * ) Notice: Subject to any disclaimer, the term of this patent is extended or adjusted under 35 U.S.C. 154(b) by 573 days.

(21) Appl. No.: 18/452,071

(22) Filed: Aug. 18, 2023

(65) Prior Publication Data

US 2025/0060055 A1 Feb. 20, 2025

(51) Int. Cl.
*F16L 9/04* (2006.01)
*F16L 1/024* (2006.01)

(52) U.S. Cl.
CPC ................ *F16L 9/04* (2013.01); *F16L 1/024* (2013.01)

(58) Field of Classification Search
CPC .................................... F16L 9/04; F16L 9/024
See application file for complete search history.

(56) References Cited

U.S. PATENT DOCUMENTS

| | | | | |
|---|---|---|---|---|
| 2,982,311 | A * | 5/1961 | Norman | F16L 58/1027 285/55 |
| 5,094,795 | A * | 3/1992 | McMillan | B29C 57/005 264/269 |
| 2002/0157784 | A1* | 10/2002 | Kiest, Jr. | F16L 55/18 264/269 |
| 2012/0012217 | A1* | 1/2012 | Hairston | F16L 55/165 264/267 |
| 2016/0258567 | A1* | 9/2016 | Hairston | B29C 63/34 |
| 2016/0348827 | A1* | 12/2016 | Kiest, Jr. | F16L 55/18 |
| 2018/0066788 | A1* | 3/2018 | Korus | F16L 55/1652 |
| 2022/0099229 | A1* | 3/2022 | Hairston | B29C 63/346 |

* cited by examiner

*Primary Examiner* — David R Deal
(74) *Attorney, Agent, or Firm* — HOVEY WILLIAMS LLP

(57) ABSTRACT

A reinforced pipe is formed from several sections of unreinforced pipe joined end-to-end to form a length of host conduit; and a seamless, flexible, fabric-reinforced pipe liner positioned inside the host conduit before the host conduit is used to carry any fluids. The unreinforced host conduit sections may be concrete, polyethylene, or other corrosion resistant storm drain pipe sections, and the pipe liner may be a seamless, flexible, fabric-reinforced pipe liner or other similar pipe liner system.

15 Claims, 3 Drawing Sheets

REINFORCED PIPE AND METHOD OF INSTALLATION

BACKGROUND

Buried fluid-carrying pipes are subject to both internal and external loads or forces. Internal loads are primarily imposed by fluid transport, pressure surges and other fluid forces in the pipes, and external loads are primarily imposed by the weight and movement of the earth under which the pipes are buried and vehicles/equipment that drive over the buried pipes. To withstand both types of loads, buried pipes are often made of steel or materials reinforced with steel. But steel and steel-reinforced pipes are very expensive. Moreover, sections of such pipes must be joined every 10-50 feet with collars, sockets, or other securement/fastening mechanisms, which is time-consuming and expensive. Further, most pipe failures occur at these pipe joints, necessitating costly and time-consuming repairs.

SUMMARY

The present invention solves the above-described problems and provides a distinct advance in the art of buried fluid-carrying pipes. More particularly, the present invention provides a reinforced pipe system that is simpler to design, construct and install, and that is less prone to pipe failures at pipe joints as it removes most liquid interface joints currently present in existing technologies of pipe systems.

A reinforced pipe constructed in accordance with an embodiment of the invention broadly comprises several sections of unreinforced pipe joined end-to-end to form a length of host conduit with first and second open ends: and a seamless, flexible, fabric-reinforced pipe liner installed inside the host conduit before the host conduit is used to carry any fluids. In one embodiment, the unreinforced pipe is concrete, polyethylene, or other corrosion resistant storm drain pipe, and the pipe liner is a seamless, flexible, fabric-reinforced pipe liner.

A method of creating and installing the reinforced pipe may comprise: laying several sections of host conduit in a trench: joining the host conduit sections end-to-end to form a length of host conduit with first and second open ends: pulling a pipe liner through the length of host conduit such that a first end of the pipe liner extends from the first end of the length of host conduit and a second end of the pipe liner extends from the second end of the length of host conduit: attaching the first end of the pipe liner to the first end of the length of host conduit: attaching the second end of the pipe liner to the second end of the length of host conduit: and attaching the first and second open ends of the host conduit to other fluid-carrying components.

By constructing and installing a reinforced pipe as described herein, numerous advantages are realized. For example, by using a relatively inexpensive concrete, polyethylene, or other corrosion resistant storm drain pipe as the host conduit and lining the host conduit with a pipe liner, significant cost savings are realized without suffering any performance limitations. The host conduit only must withstand external loads and does not require water-proof joints and therefore doesn't have to be constructed of steel or materials reinforced with steel. The internal pipe liner handles all internal pipe pressure requirements and other internal loads but does not have to withstand external forces. Together, the host conduit and pipe liner withstand all external and internal loads at a much lower cost than steel or steel reinforced pipes. Moreover, the reinforced pipe of the present invention requires far fewer joints and can extend over 1,000 plus feet with no joint collars, sleeves, or other joint securement devices and is thus far less likely to fail than conventional pipes.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 3:
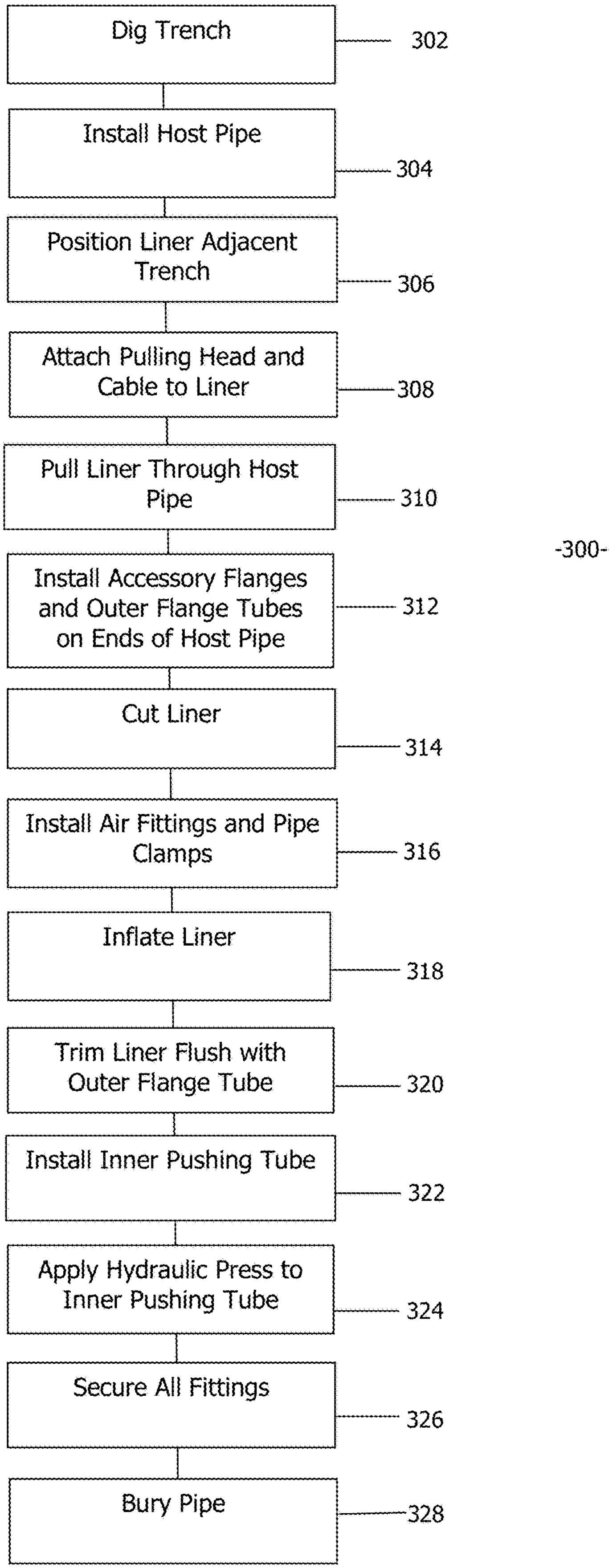

FIG. 3. is a flow diagram depicting exemplary steps in a method of installing the reinforced pipe.

The drawing figures do not limit the present invention to the specific embodiments disclosed and described herein. The drawings are not necessarily to scale, emphasis instead being placed upon clearly illustrating the principles of the invention.

DETAILED DESCRIPTION

Figure 1:
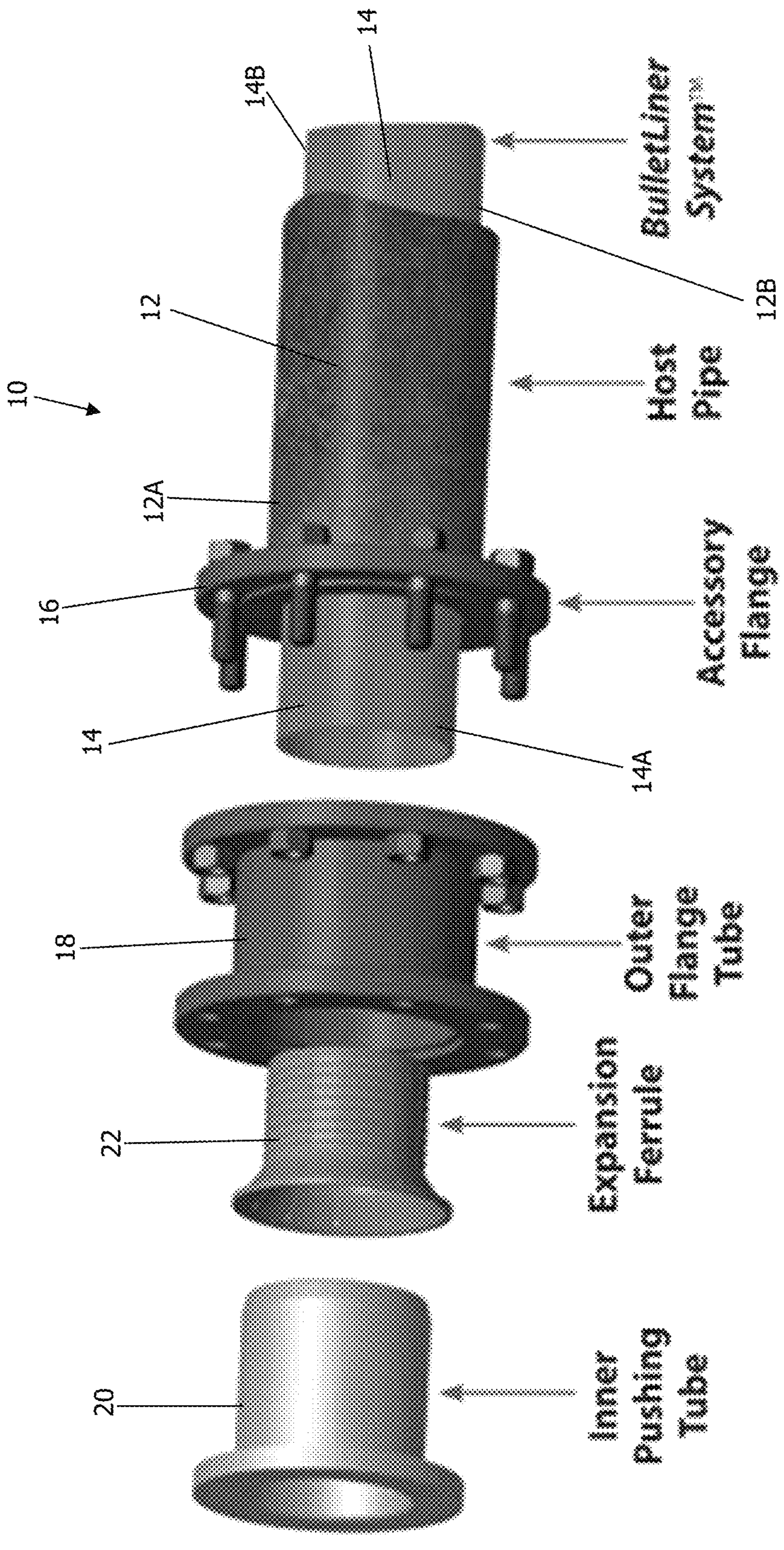
FIG. 1 is an exploded view of a section of reinforced pipe constructed in accordance with an embodiment of the present invention.

Turning now to the drawing figures, and particularly FIG. 1, a reinforced pipe 10 constructed in accordance with embodiments of the invention is illustrated. The reinforced pipe 10 is especially suited for use in storm water, wastewater, or potable water systems, but it can also be used to carry nearly any other fluids. An embodiment of the reinforced pipe broadly comprises a host conduit 12 and a pipe liner 14 pulled through the host conduit before the host conduit is buried and used to carry any fluids.

In one embodiment, the host conduit 12 is formed from several sections of unreinforced concrete, polyethylene, or other corrosion resistant storm drain pipe, but it may be formed of any sufficient structural conduit material. The host conduit may be any dimension or diameter and the constituent sections may be any length, and in one embodiment, are each approximately 10 feet long. As described in more detail below, the host conduit only must withstand external loads and does not require water-proof joints (as the inner liner is impervious to infiltration of liquid) and therefore doesn't have to be constructed of steel or materials reinforced with steel. As described in more detail below, an embodiment of the host conduit is formed from many sections of pipe connected end-to-end to form a pipe length of 1,000 feet or more.

In one embodiment, the liner is a seamless, flexible, fabric-reinforced pipe liner such as the BulletLiner System provided by CPM Pipelines (but can be any liner system that is approved or licensed by the patent holder). The liner is flexible, foldable, and light weight with a material strength equal to or equivalent to the strength required of the function as designed for each application. The liner has a smooth inner surface that provides ideal fluid flow characteristics with a surge pressure rating up to two times the operating pressure of an attached water system. Other than termination points, the liner is not mechanically connected or joined to the host conduit other than resting in it naturally and therefore functions independently of the host conduit. The internal pipe liner handles all internal pipe pressure requirements and other internal loads but does not have to withstand external ground or load forces except the naturally occurring and existing ground water, vapor or air pressure, occurring within the conduit, which are sustained by the host conduit. The liner has an outer diameter slightly less or equal to the inner dimension/diameter of the external conduit, allowing it to be installed, removed and new liner installed as needed over the lifetime of the external conduit.

The flow chart of FIG. 3 depicts an exemplary method of creating and installing the reinforced pipe 10. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

The method generally starts when an open trench is dug as depicted in step 302. The trench may be dug in any conventional manner. The trench is sized to accommodate the size of the reinforced pipe 10 and may be any depth to accommodate the freeze depth of its geographic location.

The host conduit 12 is then installed in the trench as depicted in step 304 by connecting multiple pipe sections end-to-end. Importantly, except near junction boxes or other termination points, the individual pipe sections do not have to be connected by joint collars, clamps, or other securement devices, but are instead just press-fit together, as the joints between the host conduit sections do not need to be watertight. In one embodiment, a number of host conduit sections are joined to form a 1,000 foot or longer host conduit 12 with no active securement devices between the joints.

Once the desired length of host conduit is formed, the pipe liner 14 is pulled through the host conduit 12 as depicted in steps 306-312. First, a length of the liner, typically on a rotatable spool device, is positioned near the trench as depicted in step 306. Then, a pulling head is attached to the free end of the liner and a pulling cable that has been threaded though the host conduit is attached to the pulling head as depicted in step 308. Next, the liner is pulled through the host conduit by the cable. This may be accomplished by attaching the end of the cable on the opposite end of the host conduit to any suitable pulling mechanism. At this point, a first end of the pipe liner 14A extends from a first end 12A of the host conduit and a second end of the pipe liner 14B extends from a second end 12B of the host conduit as depicted in FIG. 1. The two ends of the host conduit 12A, 12B appear close in FIG. 1 but may be over 1,000 feet apart.

Accessory flanges 16 and outer flange tubes 18 are then attached to the ends of the host conduit 12 as depicted in step 312 and as illustrated in FIG. 1. These flanges 16 and flange tubes 18 are used to connect the ends of the liner 14A,B to the ends of the host conduit 12A,B and to install valves, access points, and other accessories to the host conduit.

Figure 2:
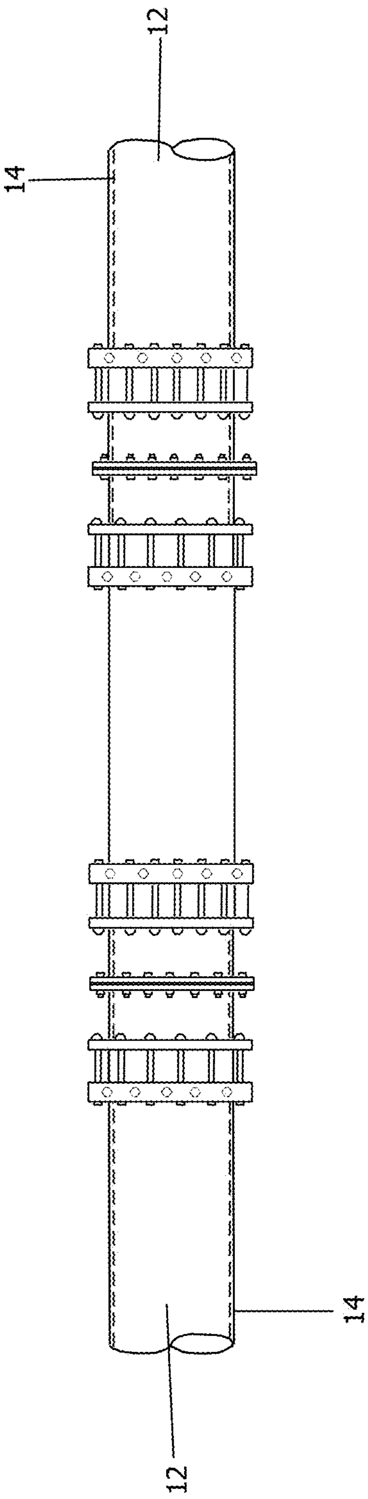
FIG. 2 is an elevational view of portions of the reinforced pipe in a typical junction box or termination point.

The ends of the liner are then cut as depicted in step 314 such that a short length of the liner extends from both ends of the host conduit. At least one air fitting is then attached to one end of the liner and pipe clamps are attached to both ends of the liner to temporarily seal the liner as depicted in step 316. The liner is then inflated as depicted in step 318 by attaching a source of pressurized air to the air fittings. This presses the outer surface of the liner against the inner surface of the host conduit as depicted in FIG. 2.

The ends of the liner are then trimmed so that they are flush with the ends of the outer flange tube as depicted in step 320. A pushing tube is then placed inside each end of the host conduit as depicted in step 322, and the pushing tubes are pressed into the host conduit as depicted in step 324 to secure the ends of the liner to the ends of the host conduit. All fittings are then tightened as depicted in step 326. An expansion ferrule 22 may also be pushed into the ends of the host conduit to prevent the pipe liner from slipping in the host conduit.

The ends of the host conduit can then be attached to ancillary items such as valves, access points and the like. Once all fluid connections are made, the pipe 10 is buried by filling the trench with dirt or other fill material as depicted in step 328.

The above-described reinforced pipe 10 is more economical to install, requires far fewer joints, and is less prone to pipe failures than conventional buried pipes. Specifically, by using a relatively inexpensive concrete, polyethylene, or other corrosion resistant storm drain pipe as the host conduit and lining the host conduit with a pipe liner, significant cost savings are realized without suffering any performance limitations. The host conduit only must withstand external loads and does not require water-proof joints and therefore doesn't have to be constructed of steel or materials reinforced with steel. The internal pipe liner handles all internal pipe pressure requirements and other internal loads but does not have to withstand external forces. Together, the host conduit and pipe liner withstand all external and internal loads at a much lower cost than steel or steel reinforced pipes. Moreover, the reinforced pipe of the present invention requires far fewer joints and can extend over 1,000 feet with no joint collars, sleeves, or other joint securement devices and is this far less likely to fail than conventional pipes.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of creating and installing a reinforced pipe that has never been used to carry fluids, the method comprising:
- laying several sections of host conduit in a trench;
- joining the host conduit sections end-to-end to form a length of host conduit with first and second open ends and without waterproof joints between the host conduit sections;
- before any fluids are ever carried in the length of host conduit, pulling a pipe liner through the length of host conduit such that a first end of the pipe liner extends from the first end of the length of host conduit and a second end of the pipe liner extends from the second end of the length of host conduit;
- attaching the first end of the pipe liner to the first end of the length of host conduit;
- attaching the second end of the pipe liner to the second end of the length of host conduit; and
- attaching the first and second open ends of the host conduit to other fluid-carrying components such that fluids can be carried in the length of host pipe and the pipe liner only after the pipe liner is installed in the length of host conduit.

2. The method of claim 1, wherein the host conduit sections are sections of unreinforced concrete, polyethylene, or other corrosion resistant storm drain pipes.

3. The method of claim 1, wherein the pipe liner is a seamless, flexible, fabric-reinforced pipe liner or other similar pressure pipe liner system.

4. The method of claim 1, wherein the other fluid-carrying components are selected from the group consisting of valves, access points, closure pieces, and other host conduit sections.

5. The method of claim 1, wherein the joining step comprises pressing the host conduit sections together but attaching no collars, rings, or other securement devices to the host conduit sections.

6. The method of claim 1, wherein the pulling step comprises attaching a pulling head to the first end of the pipe liner, attaching a pulling cable to the pulling head, and pulling the pipe liner through the length of host conduit by the pulling cable.

7. The method of claim 1, further comprising inflating the pipe liner after it has been pulled through the length of host conduit to press an outside surface of the pipe liner against an interior surface of the length of host conduit.

8. The method of claim 7, wherein the inflating step comprises attaching an air fitting and pipe clamp to the first end of the pipe liner and introducing pressurized air into the pipe liner through the air fitting.

9. The method of claim 1, further comprising covering the trench with fill materials.

10. A method of creating and installing a reinforced pipe comprising:
- digging a trench;
- laying several sections of unreinforced concrete storm drain pipes in the trench;
- joining the unreinforced concrete storm drain pipe sections end-to-end to form a length of host conduit with first and second open ends and without waterproof joints between the drain pipes;
- before any fluids are ever carried in the length of host conduit, pulling a seamless, flexible, fabric-reinforced pipe liner through the length of host conduit such that a first end of the pipe liner extends from the first end of the length of host conduit and a second end of the pipe liner extends from the second end of the length of host conduit;
- attaching the first end of the pipe liner to the first end of the length of host conduit;
- attaching the second end of the pipe liner to the second end of the length of host conduit;
- attaching the first and second open ends of the host conduit to other fluid-carrying components; and
- covering the trench with fill materials, wherein fluids are only carried in the drain pipes or the pipe liner after the pipe liner is installed in the length of host conduit.

11. The method of claim 10, wherein the other fluid-carrying components are selected from the group consisting of valves, access points, closure pieces, and other host conduit sections.

12. The method of claim 10, wherein the joining step comprises pressing the unreinforced concrete storm drain pipe sections together but attaching no collars, rings, or other securement devices to the pipes sections.

13. The method of claim 10, wherein the pulling step comprises attaching a pulling head to the first end of the pipe liner, attaching a pulling cable to the pulling head, and pulling the pipe liner through the length of host conduit by the pulling cable.

14. The method of claim 10, further comprising inflating the pipe liner after it has been pulled through the length of host conduit to press an outside surface of the pipe liner against an interior surface of the length of host conduit.

15. The method of claim 14, wherein the inflating step comprises attaching an air fitting and pipe clamp to the first end of the pipe liner and introducing pressurized air into the pipe liner through the air fitting.

* * * * *